United States Patent
Hofmann

(10) Patent No.: US 6,711,946 B2
(45) Date of Patent: Mar. 30, 2004

(54) METHOD FOR TESTING THE BRAKE OF AN ELECTRIC MOTOR

(75) Inventor: Joseph Hofmann, Wolferstadt (DE)

(73) Assignee: Kuka Roboter GmbH, Augsburg (DE)

( * ) Notice: Subject to any disclaimer, the term of this patent is extended or adjusted under 35 U.S.C. 154(b) by 166 days.

(21) Appl. No.: 10/013,112

(22) Filed: Dec. 6, 2001

(65) Prior Publication Data

US 2002/0069697 A1 Jun. 13, 2002

(30) Foreign Application Priority Data

Dec. 13, 2000 (DE) .......................... 100 62 228

(51) Int. Cl.[7] ................................. G01L 5/28
(52) U.S. Cl. ...................................... 73/121
(58) Field of Search .............. 73/116, 121, 862.08, 73/862.191, 862.27, 862.193

(56) References Cited

U.S. PATENT DOCUMENTS 5,683,149 A * 11/1997 Aizawa et al. ................ 303/10

FOREIGN PATENT DOCUMENTS

EP    0 924 583 A2    6/1999

* cited by examiner

*Primary Examiner*—Robert Raevis
(74) *Attorney, Agent, or Firm*—McGlew and Tuttle, PC

(57) ABSTRACT

For monitoring the state of a motor brake, the invention provides a method by means of which in a measuring sequence in speed-regulated operation, the brake is applied for a short time and over this time a motor current is measured and the brake torque determined on the basis of the thus obtained measuring data.

11 Claims, 3 Drawing Sheets

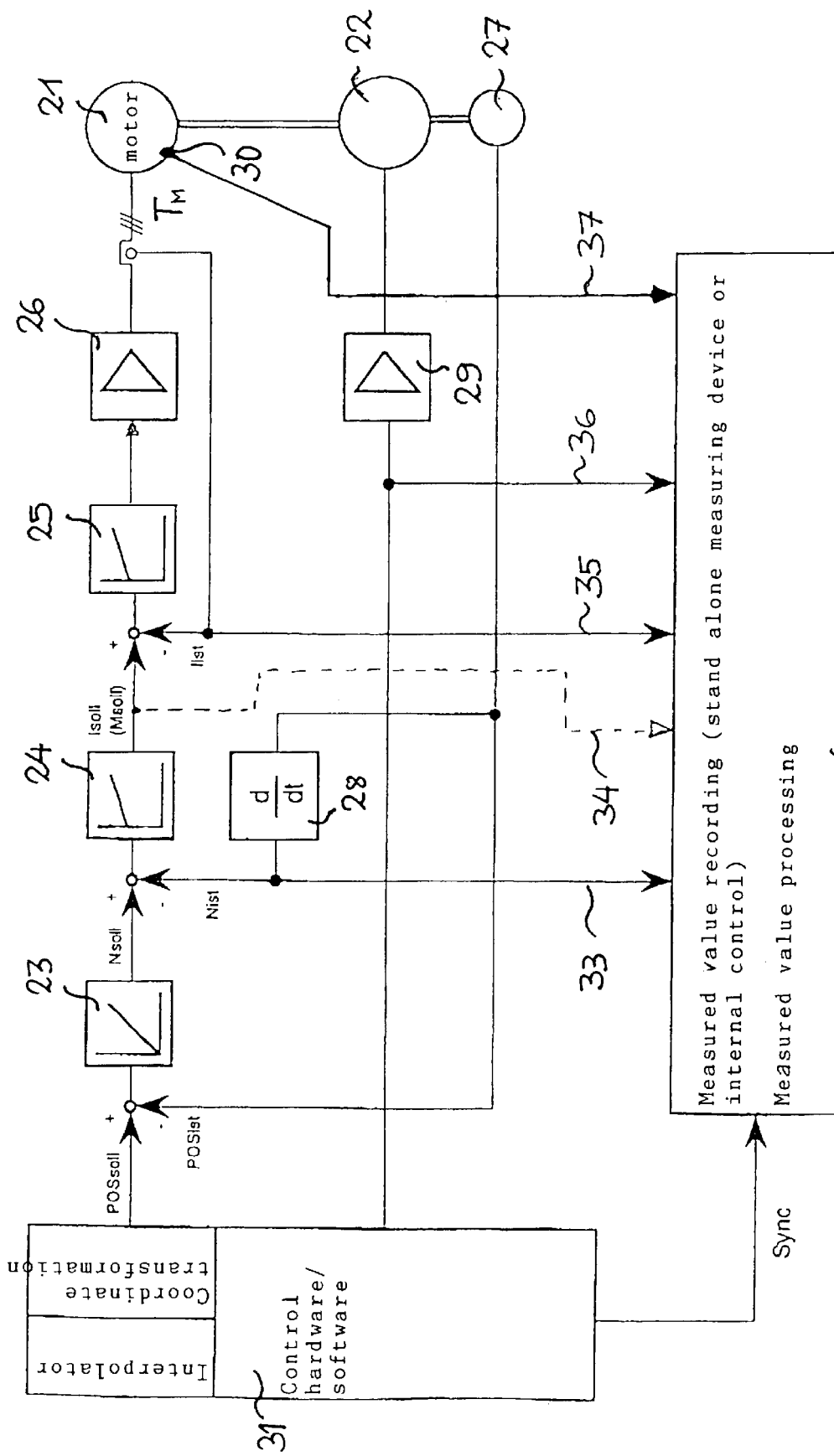

METHOD FOR TESTING THE BRAKE OF AN ELECTRIC MOTOR

FIELD OF THE INVENTION

The invention relates to a method for inspecting or testing the brake of an electric motor.

BACKGROUND OF THE INVENTION

Brakes used in servodrives, such as in speed-regulated motor drives of a robot, have a safety function within the framework of brake assistance during emergency braking, fixed braking of machine axles in the power-off or deenergized state, optionally against gravitational force, etc. Therefore it is necessary to ensure that the brakes always function correctly. As such brakes, particularly in the case of temporary dynamic loading, as occurs with brake assistance during emergency braking, are subject to wear, it is necessary to monitor their characteristics. For safety reasons use is mainly made of electromagnetic brakes with spring pretension, in which the braking action is cancelled out by the compensation of a permanent magnetic field on applying a control voltage. However, the invention is not limited thereto.

EP 924 538 A2 provides a method and an arrangement for the checking of motor brakes, in which with the motor stationary the brake is activated, briefly a starting voltage is connected in and then the motor current is compared with a preset desired value, so that in the case of undesired divergences a malfunction of the brake is recognized and corresponding measures can be carried out for bringing about a safe operating state of the electric motor. The comparison or reference desired value must be chosen in such a way that even with a relatively large brake torque range in all cases a reliable and safe disconnection occurs. In this procedure a monitoring of a change to the state of the brake cannot be carried out when taking account of the large range existing for different brakes and in particular not with respect to the influences of temperature, dirtying, abrasion and other ageing effects, as well as premature wear due to dynamic braking processes.

Therefore the problem of the invention is to propose a method for monitoring the change in the characteristics of a brake, which can be performed during the operation of the motor, such as e.g. that of a robot.

SUMMARY OF THE INVENTION

According to the invention this problem is solved in the case of a method of the aforementioned type, which is characterized in that in a measuring sequence in speed-regulated operation the brake is applied for a short time and at least during this time a&motor current is measured and on the basis of the measuring data obtained in this way the brake torque of the brake is determined. The motor current is preferably obtained over a complete measuring sequence.

Whereas in the prior art the motor is stopped for checking the brake and then the checking process is initiated, according to the invention the function of the brake is checked and therefore a change to its behaviour takes place in speed-regulated operation, in that the brake is applied for a short time, optionally several times and as a result of the measuring data obtained the brake torque is determined, the measured result being used for comparison purposes during subsequent inspections.

The brake torque is determined on the basis of different motor moments with the brake applied and eased. According to a preferred embodiment the motor moment is determined by measuring the motor current and in particular the brake torque $M_{3R}$ is determined by $I_2^* K_{T2} - I_1^* K_{tr}$, in which $I_1$, $I_2$ are motor currents with the brake released and applied and $K_{T1}$, $K_{T2}$ are the associated moment constants of the motor at current $I_1$ or $I_2$.

According to another preferred development of the invention the brake is applied for less than one second and in particular in quantitative form, i.e. on the basis of its size for only a few tenths of a second. It is possible for brake application to be repeated in a measuring sequence and for there to be a reversal of the rotation direction of the motor between brake applications or following groups of brake applications for the same rotation direction. In the specific case where a gravitational moment is present, such as e.g. in movements about the A2 or A3 axis of a robot, the measurement is performed during a movement of the robot and is assisted by an optionally present gravitational moment.

To take account of the motor or brake temperature $T_{BR}$, the motor temperature being considered representative of the brake temperature, it is possible for a concomitant measurement thereof to take place and for it to be used for correcting the brake torque determined.

According to further developments of the method according to the invention, the measuring data are recorded and in addition the data are displayed or printed out. In a further development the measuring data of different measuring sequences are automatically compared.

BRIEF DESCRIPTION OF THE DRAWINGS

Further advantages and features of the invention become apparent from the following description of an embodiment of the invention with reference to the attached drawings, wherein show:

FIG. 3 A basic circuit diagram for a preferred development of the invention for performing the method according to the invention.

DETAILED DESCRIPTION OF THE DRAWINGS

Figure 1:
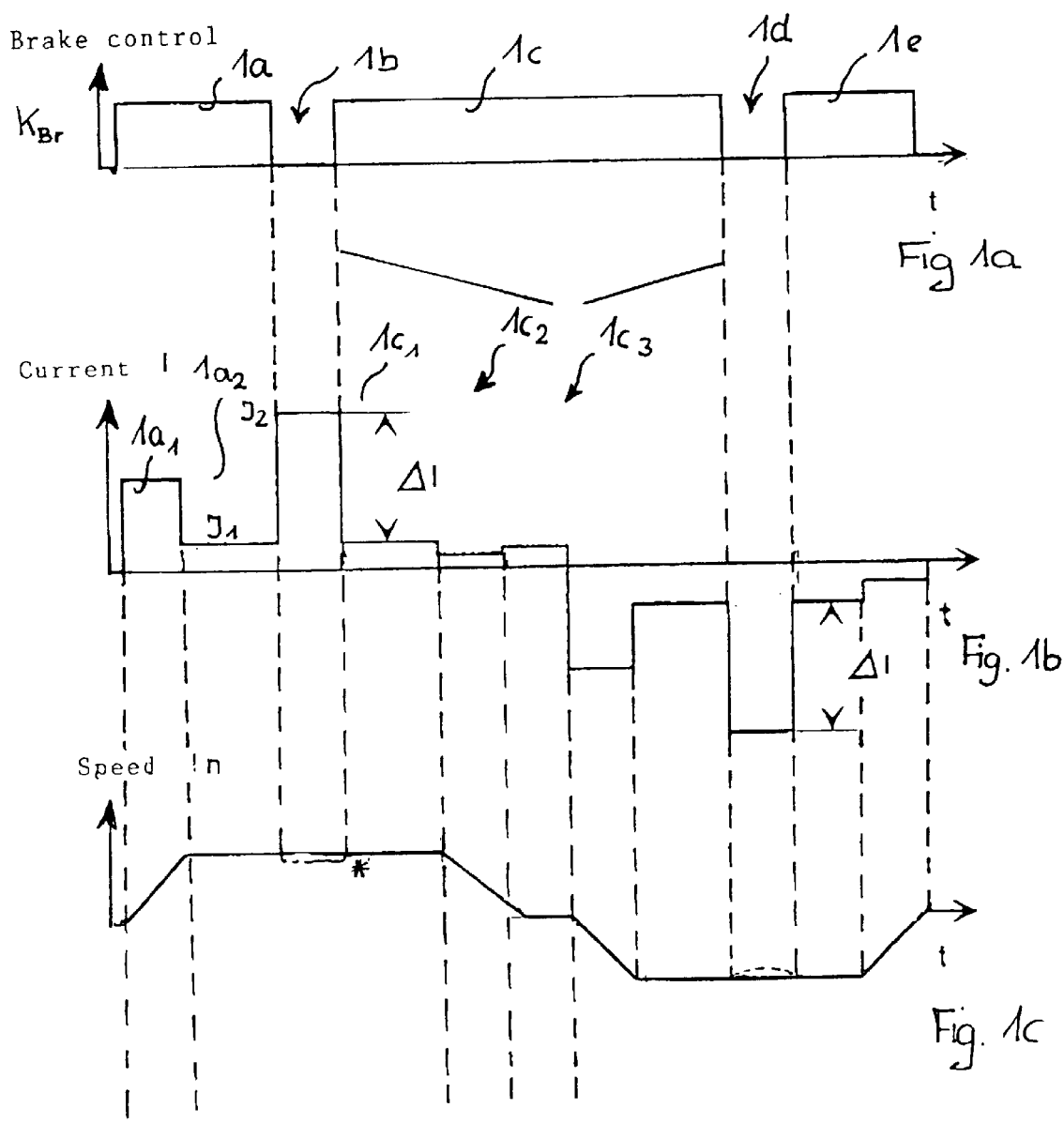
FIGS. 1a to c Graphs for the brake control (FIG. 1a) for the motor current (FIG. 1b) and for the speed behaviour (FIG. 1c) of the motor.

FIG. 1a shows the brake control in conjunction with the performance of the inventive method for testing the brake of an electric motor. On the abscissa (as in FIGS. 1b and 1c) is plotted the time, whereas in FIG. 1a on the ordinate is plotted the brake release voltage $U_{br}$. For a maximum brake release voltage the field of a permanent magnet is compensated and the brake is released by spring tension, whereas with the brake release voltage 0 the brake has been applied and consequently exerts a brake torque. In the time periods 1a, 1c, 1e the brake is consequently released and in the time periods 1b and 1d applied.

FIG. 1b shows the current distribution of the motor over a complete movement sequence. Firstly the motor is accelerated to its desired speed (FIG. 1c) with a relatively high current in time interval $1a_1$ and this is reflected by a speed rise in FIG. 1c. On reaching the desired speed this is maintained in the time interval $1a_2$ with a lower motor current. In time interval 1b, with the brake applied, the current I rises sharply due to the speed regulation for maintaining the desired speed. In this range there is a slight speed drop, which is not visible in the graph, but is immediately regulated back to the desired value. On releasing the brake again the current for maintaining the speed drops again in time interval $1c_1$ to its original value. (interval $1a_2$). In interval $1c_2$ the motor runs down to the stationary state (drop of speed N in FIG. 1c to zero). In the further half of the diagrams of FIGS. 1b to 1c the same sequence takes place with the reversed rotation direction.

Figure 2:
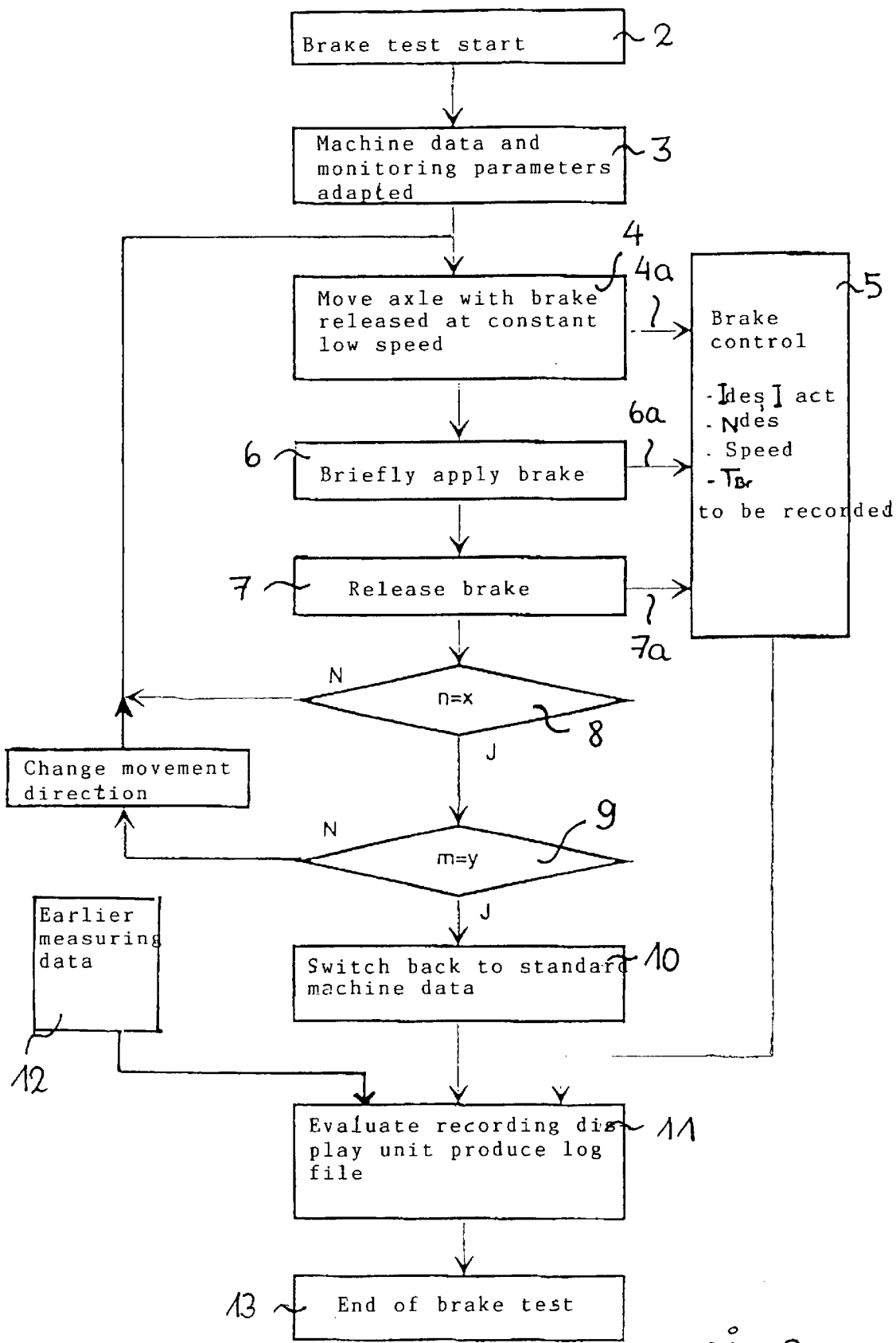
FIG. 2 A flow chart of an embodiment of the method according to the invention.

For performing the method according to the invention with the drive running the brake test is started 2 (FIG. 2). For this there is firstly an adaptation 3 of the robot machine data and in particular the motor control and the robot monitoring parameters. This involves the monitoring means tolerating divergences due to the measurement, such as for a slight speed reduction through braking, without any fault indication and disconnection. On moving 4 the corresponding axle, preferably with a constant, low speed, the essential parameters such as the movement current, speed, temperature, brake control state in interval $1a_2$ (FIGS. 1b and 1c) are recorded 4a. Subsequently there is a brief application 6 of the brake for a few tenths of a second (interval 1b in FIG. 1a), during which there is a recording 6a of the corresponding parameters. Subsequently the brake is released 7 again and there is a further measurement 7a and recording of the indicated parameters.

Within the framework of a measuring sequence it is possible for a multiple repetition 8 to take place up to a preset number x. Moreover, either, after each of the aforementioned sequences or after a preset number x, there can be a reversal 9 of the motor rotation direction and the measuring and testing sequence can be performed in the reverse rotation direction.

After performing the desired number of measuring sequences there is a switching back 10 to the operating machine data. This is followed by an evaluation 11 of the recording, optionally using earlier measuring data 12 and the storage of the result obtained. The brake test is then ended 13.

The brake torque characteristic for the state of the brake is calculated from the difference between the motor moment with the brake applied and released and therefore according to $$M_{Br}=I_2{}^* K_{T2}-I_1{}^* K_{T1},$$

in which $I_1$, $I_2$ are the motor currents with the brake released or applied and $K_{T1}$, $K_{T2}$ are the moment constants of the motor at current $I_1$ or $I_2$.

The moment constant of the motor (defined by motor moment/motor current) as a first approximation can be considered constant, so that the above relationship is simplified to $M_{BR}=\Delta I^* K_T$, in which $\Delta I_2=I_2-I_1$. The moment constant of the motor is given in the data sheet of the motor manufacturer. For more precise results, as indicated by the first formula, account must be taken of the dependence of the moment constant on the motor current, speed and motor temperature, so that it may be necessary to measure and record the same and to determine the brake torque in the aforementioned formula (1) whilst taking account of temperature-dependent factors in a software filed moment constant table of the manufacturer with corrected moment constants.

FIG. 3 shows a cascade control for the speed regulation of a motor 21 with a motor brake 22. The control comprises a position controller 23, a speed controller 24, a current controller 25 and a power amplifier 26, as well as a position indicator 27 and a differentiating element 28 between the latter and the speed controller for determining the actual speed $N_{act}$ from the time change of the positions measured by the position indicator 27. A switching or control stage 29 is positioned upstream of the brake 22. The motor temperature is measured by means of a temperature sensor 30. The control takes place by means of a control unit 31, in particular a control computer. The measurement and evaluation of the measured results takes place by means of a recording unit 32.

The speed regulation of the motor 21 takes place through the cascade control in the usual way, the position controller 23 giving a desired speed $N_{des}$, which is compared in the speed controller 24 with the actual speed $N_{act}$ obtained by means of the position indicator 27 and the differentiating element 28 and in the case of a divergence a desired current value $I_{des}$ (which corresponds to the desired torque $M_{des}$) is preset. The latter is compared with the actual current value $I_{act}$ and brings about in the case of a divergence an actuating signal for the power amplifier 26, which supplies the motor with the necessary voltage. For performing the brake test the release voltage $U_{Br}$ raising the brake 22 is reduced or switched off by the control unit 31 via the switching stage 29 and the brake is applied. This consequently reduces the motor speed, which is established by means of the position indicator 27 and/or speed controller 24, so that within the framework of the speed regulation the current increase shown in FIGS. 1a to 1c for maintaining the desired speed $N_{des}$ takes place.

For measuring the brake state through the recording with the measuring unit 32 preferably the following values are determined: actual speed $N_{act}$ 33, desired current $I_{des}$ 34 and/or actual current $I_{act}$ 35, brake control signal 36 and motor temperature 37. From these values and in the manner described hereinbefore the brake state is determined and compared with earlier data. The results are stored, displayed and/or printed out.

What is claimed is:

1. Method for checking the brake of an electric motor, characterized in that in a measuring sequence in speed-regulated operation the brake is applied for a short time and at least during this time a motor current is measured and on the basis of measured data obtained in this way the brake torgue of the brake is determined.

2. Method according to claim 1, characterized in that the brake torque is determined on the basis of the motor currents with the brake released and applied.

3. Method according to claim 1, characterized in that the brake is applied for the time of at least one motor revolution.

4. Method according to claim 1, characterized in that brake application is repeated in a measuring sequence.

5. Method according to claim 1, characterized in that there is a reversal of the rotation direction of the motor between brake applications or after groups of brake applications for the same rotation direction.

6. Method according to claim 1, characterized in that the measurement is performed during a movement of the motor, which is assisted by an optionally present gravitational moment.

7. Method according to claim 1, characterized in that the motor and/or brake temperature is measured and used for correcting the determined brake torque.

8. Method according to claim 1, characterized in that the measured data are recorded.

9. Method according to claim 1, characterized in that the measured data are displayed.

10. Method according to claim 1, characterized in that the measured data are printed out.

11. Method according to claim 1, characterized in that the measured data of different measuring sequences are automatically compared.

* * * * *